United States Patent
Baumoel (10) Patent No.: US 9,752,907 B2
(45) Date of Patent: Sep. 5, 2017

(54) PHASE CONTROLLED VARIABLE ANGLE ULTRASONIC FLOW METER

(71) Applicant: Joseph Baumoel, Wellington, FL (US)

(72) Inventor: Joseph Baumoel, Wellington, FL (US)

(*) Notice: Subject to any disclaimer, the term of this patent is extended or adjusted under 35 U.S.C. 154(b) by 0 days.

(21) Appl. No.: 14/934,527

(22) Filed: Nov. 6, 2015

(65) Prior Publication Data

US 2016/0305805 A1    Oct. 20, 2016

Related U.S. Application Data

(60) Provisional application No. 62/147,272, filed on Apr. 14, 2015.

(51) Int. Cl.
*G01F 1/66* (2006.01)
*B06B 1/02* (2006.01)
*B06B 1/06* (2006.01)
*G10K 11/34* (2006.01)
*G01F 15/02* (2006.01)

(52) U.S. Cl.
CPC .............. *G01F 1/663* (2013.01); *G01F 1/662* (2013.01); *G01F 1/667* (2013.01); *G01F 1/668* (2013.01); *G01F 15/022* (2013.01)

(58) Field of Classification Search
None
See application file for complete search history.

(56) References Cited

U.S. PATENT DOCUMENTS

| | | | |
|---|---|---|---|
| 2,746,291 A | 5/1956 | Swengel | |
| 3,817,098 A | 6/1974 | Brown | |
| 4,070,905 A | 1/1978 | Kossoff | |
| 4,144,752 A | 3/1979 | Lolk | |
| 4,170,142 A | 10/1979 | Posakony et al. | |
| 4,235,112 A | 11/1980 | Kaiser | |
| 4,297,607 A | 10/1981 | Lynnworth et al. | |
| 4,480,486 A | 11/1984 | Meisser et al. | |
| 4,537,073 A | 8/1985 | Ooshiro et al. | |
| 4,670,683 A | 6/1987 | 't Hoen | |
| 4,693,319 A | 9/1987 | Amemiya | |
| 4,734,963 A * | 4/1988 | Ishiyama | B06B 1/0622 310/365 |
| 5,052,230 A | 10/1991 | Lang et al. | |
| 5,060,651 A | 10/1991 | Kondo et al. | |

(Continued)

OTHER PUBLICATIONS

International Search Report dated Apr. 15, 2015 corresponding to PCT/US2014/069046.

(Continued)

*Primary Examiner* — Harshad R Patel

(74) *Attorney, Agent, or Firm* — F. Chau & Associates, LLC (57) ABSTRACT

An ultrasonic flowmeter includes a conduit for receiving a flow of a fluid and a flexible printed circuit board (FPC) including: a pair of ultrasonic transducers, wherein each transducer comprises a piezoelectric element divided into a plurality of segment electrodes and the FPC is bonded around the conduit; and a control circuit configured to sequentially activate the segment electrodes using a pulse train to cause at least one of the piezoelectric elements to emit a sonic signal. A delay time between activation of each successive segment electrode controls a phase velocity and an angle of emission of the corresponding sonic signal.

20 Claims, 9 Drawing Sheets

(56) References Cited

U.S. PATENT DOCUMENTS

| | | | |
|---|---|---|---|
| 5,105,666 A | 4/1992 | Steinacher | |
| 5,161,413 A | 11/1992 | Junker et al. | |
| 5,228,347 A | 7/1993 | Lowell et al. | |
| 5,433,117 A | 7/1995 | Taphorn et al. | |
| 5,437,194 A | 8/1995 | Lynnworth | |
| 5,597,962 A | 1/1997 | Hastings et al. | |
| 5,627,323 A | 5/1997 | Stern | |
| 5,637,800 A * | 6/1997 | Finsterwald | B06B 1/0622 |
| | | | 73/861.27 |
| 5,811,689 A | 9/1998 | Collier et al. | |
| 6,026,693 A | 2/2000 | Baumoel et al. | |
| 6,055,868 A | 5/2000 | Koyano et al. | |
| 6,118,205 A | 9/2000 | Wood et al. | |
| 6,338,277 B1 | 1/2002 | Diston et al. | |
| 7,096,135 B2 * | 8/2006 | Ao | G01F 1/667 |
| | | | 73/861.27 |
| 7,343,818 B2 * | 3/2008 | Gysling | G01F 1/704 |
| | | | 73/861.18 |
| 7,448,282 B2 | 11/2008 | Wiest et al. | |
| 7,624,651 B2 * | 12/2009 | Fernald | G01F 1/7082 |
| | | | 73/861.27 |
| 7,911,306 B2 | 3/2011 | Allen | |
| 8,229,686 B2 * | 7/2012 | Rawat | G01F 1/708 |
| | | | 73/861.27 |
| 8,356,522 B2 | 1/2013 | Allen | |
| 8,489,342 B2 * | 7/2013 | Dugger | G01F 1/667 |
| | | | 73/861.28 |
| 8,505,391 B1 | 8/2013 | Baumoel | |
| 8,770,028 B2 | 7/2014 | Kleinert | |
| 9,494,454 B2 | 11/2016 | Baumoel | |
| 2002/0073781 A1 | 6/2002 | Hashimoto et al. | |
| 2003/0051559 A1 | 3/2003 | Ehrlich et al. | |
| 2003/0055337 A1 | 3/2003 | Lin | |
| 2004/0070100 A1 | 4/2004 | Strobel et al. | |
| 2007/0034016 A1 | 2/2007 | Maginnis et al. | |
| 2007/0044571 A1 * | 3/2007 | Gysling | G01F 1/74 |
| | | | 73/861.18 |
| 2007/0186681 A1 | 8/2007 | Shkarlet et al. | |
| 2008/0236297 A1 | 10/2008 | Fleet et al. | |
| 2009/0016555 A1 | 1/2009 | Lynnworth | |
| 2009/0019945 A1 | 1/2009 | Matsushita | |
| 2010/0000331 A1 * | 1/2010 | Gysling | G01F 1/662 |
| | | | 73/861.28 |
| 2010/0151173 A1 | 6/2010 | Peduto | |
| 2010/0192702 A1 | 8/2010 | Satou et al. | |
| 2010/0257941 A1 * | 10/2010 | Gysling | G01F 1/667 |
| | | | 73/861.28 |
| 2011/0283821 A1 * | 11/2011 | Ober | G01N 33/0031 |
| | | | 73/866.1 |
| 2012/0144930 A1 | 6/2012 | Aughton et al. | |
| 2013/0080081 A1 | 3/2013 | Dugger et al. | |
| 2013/0106443 A1 * | 5/2013 | Jackson | G01N 33/5438 |
| | | | 324/679 |
| 2013/0178750 A1 * | 7/2013 | Sheehan | A61F 2/2403 |
| | | | 600/486 |
| 2015/0160053 A1 * | 6/2015 | Baumoel | G01F 1/667 |
| | | | 73/861.28 |

OTHER PUBLICATIONS

Office Action dated Jan. 16, 2015 in related case for U.S. Appl. No. 14/255,408.
Office Action dated May 27, 2015 in related case for U.S. Appl. No. 14/255,408.
Office Action dated Oct. 8, 2015 in related case for U.S. Appl. No. 14/256,408.
Office Action dated Feb. 8, 2016 in related case for U.S. Appl. No. 14/255,408.
Advisory Action dated May 10, 2016 in related case for U.S. Appl. No. 14/255,408.

* cited by examiner

PHASE CONTROLLED VARIABLE ANGLE ULTRASONIC FLOW METER

CROSS-REFERENCE TO RELATED APPLICATIONS

This application claims priority to U.S. Provisional Application No. 62/147,272, filed on Apr. 14, 2015 the disclosure of which is incorporated by reference herein.

1. TECHNICAL FIELD

The present disclosure relates to ultra sonic flow meters, and more particularly to adjustable refraction angle non-intrusive ultrasonic flow meters.

2. DISCUSSION OF RELATED ART

Various liquids and gases are distributed by suppliers to consumers in both commercial and residential applications, requiring the measurement of these substances to determine the payment to be made by the consumer to the supplier. Of consummate importance is that the measurement accuracy be accepted by both the supplier and consumer.

Typical of such a situation is the supply of natural gas, oil or water from a utility to a residential or commercial customer. A conventional method of measurement of Natural Gas is via a mechanical device through which the supplied gas flows, and in which rotates gears which drive numerical displays which indicate the amount of product which has been delivered. Such mechanical devices are subject to a wide variety of changes in calibration due to wear and changes in temperature, pressure and humidity. Other mechanical devices, such as turbines, orifice plates and pressure sensors can perform the same function, but are also subject to calibration variation due to similar causes. In particular, the operation of all mechanical devices is subject to friction effects, which can vary over time and affect measurement accuracy.

Unlike mechanical flow meters, Transit Time Ultrasonic flow meters have no moving parts and therefore friction is not a factor in their operation. Accordingly, Ultrasonic flow meters, of both the Clamp-On and Wetted types, have been used quite successfully in commercial applications. However, they are subject to other sources of calibration change.

SUMMARY OF THE INVENTION

According to an exemplary embodiment of the invention, an ultrasonic flowmeter is provided that includes a conduit for receiving a flow of a fluid and a flexible printed circuit board (FPC) including: a pair of ultrasonic transducers, wherein each transducer comprises a piezoelectric element divided into a plurality of segment electrodes and the FPC is bonded around the conduit; and a control circuit configured to sequentially activate the segment electrodes using a pulse train to cause at least one of the piezoelectric elements to emit a sonic signal. A delay time between activation of each successive segment electrode controls a phase velocity and an angle of emission of the corresponding sonic signal.

BRIEF DESCRIPTION OF THE DRAWINGS

Exemplary embodiments of the invention can be understood in more detail from the following descriptions taken in conjunction with the accompanying drawings in which.

DETAILED DESCRIPTION

Exemplary embodiments of the present invention will be described below in more detail with reference to the accompanying drawings. This invention may, however, be embodied in different forms and should not be construed as limited to the embodiments set forth herein. Rather, these embodiments are provided so that this disclosure will be thorough and complete, and will fully convey the scope of the invention to those skilled in the art.

At least one embodiment of the invention is based on use of phase control, as will be described below, to control the angle of emission of an ultrasonic beam relative to the plane of the surface of an emitter of ultrasonic energy within an ultrasonic flow meter. The plane may be formed by an object into which such ultrasonic energy is introduced. For example, if the emitter is a piezoelectric element such as a piezoelectric crystal, the plane is the surface of the crystal. The piezoelectric element may also be a piezoelectric ceramic. Thus, whenever a crystal or a piezoelectric crystal is described herein, it may be replaced with another piezoelectric element such as a piezoelectric ceramic.

Figure 1:
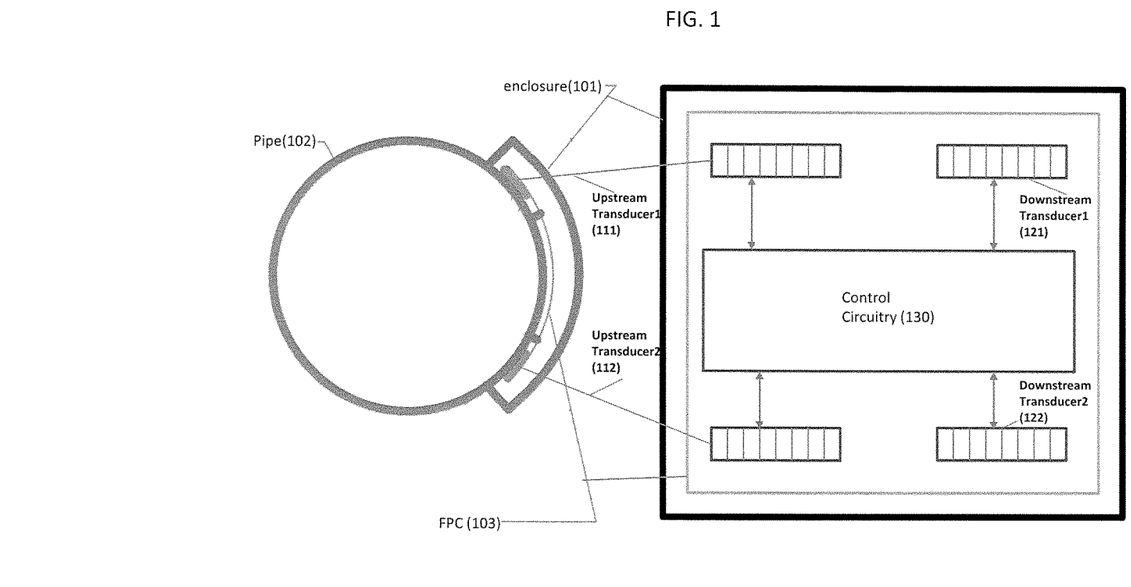
FIG. 1 illustrates an ultrasonic flow meter according to an exemplary embodiment of the invention.

FIG. 1 illustrates an ultrasonic flow meter according to an exemplary embodiment of the invention. The flow meter includes one or more pairs of transducers. For example, FIG. 1 illustrates a first pair of transducers including a first upstream transducer 111 and a first downstream transducer 121, and a second pair of transducers including a second upstream transducer 112 and a second downstream transducer 122. While FIG. 1 shows two pairs of transducers, embodiments of the invention are not limited thereto. In an exemplary embodiment of the invention, the flow meter only includes a single pair of transducers. For example, in this embodiment, the second upstream transducer 112 and a second downstream transducer 122 would be omitted.

Figure 2:
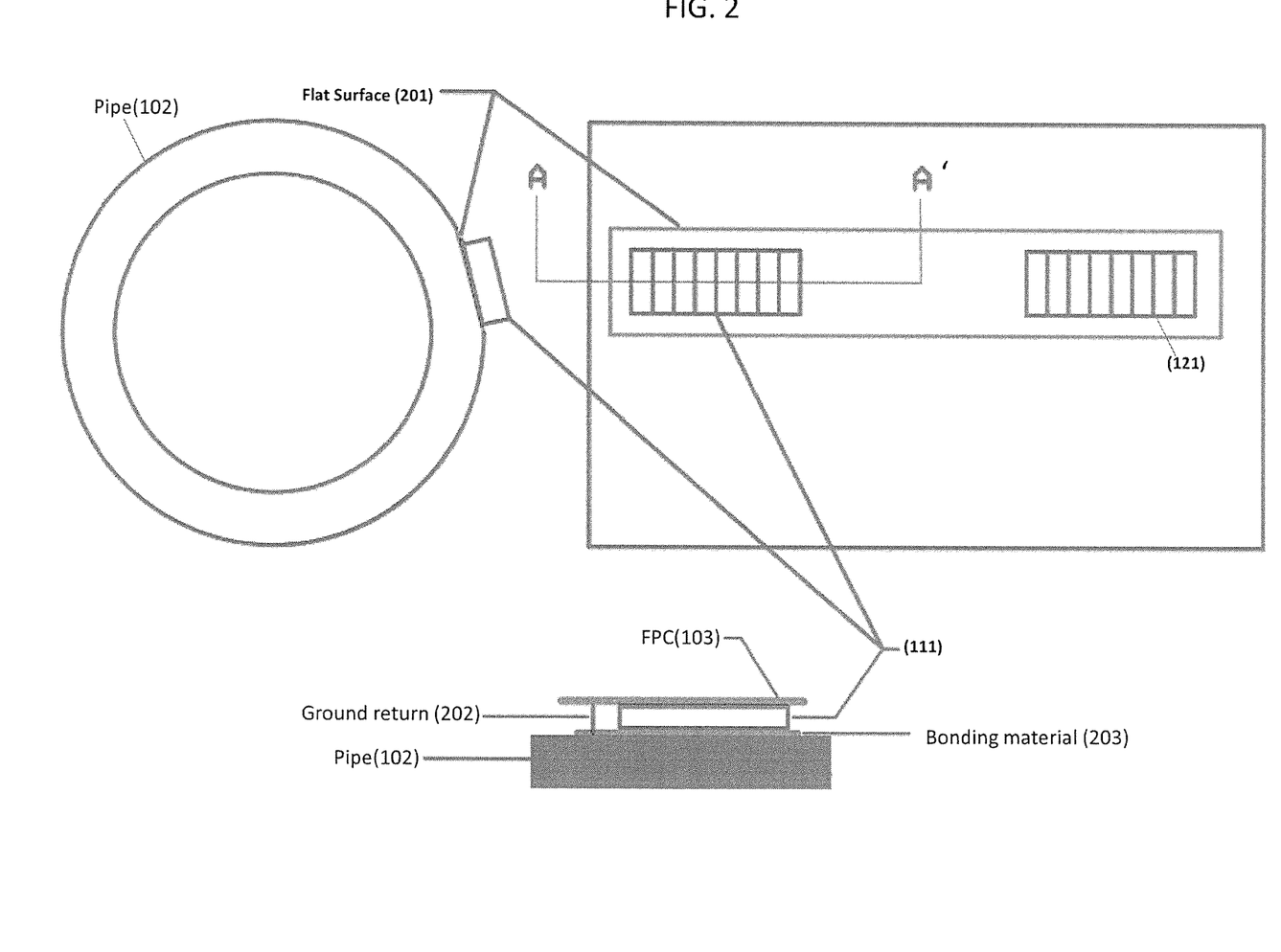
FIG. 2 illustrates how transducers of the ultrasonic flow meter are affixed to a conduit according to an exemplary embodiment of the invention.

Each transducer is a segmented piezoelectric crystal designed to bond to the exterior of a pipe 102. For example, each crystal comprises a plurality of segments or segment electrodes. A designated frequency pulse train is applied sequentially to a first segment or segment electrode of a given transducer and to each adjacent segment or segment electrode, resulting in a sonic beam, which emits at an angle relative to the radius of the pipe 102. The angle is determined by the phase velocity Vphase of the segmented crystal and the sonic propagation velocity Vm of the medium inside the pipe (e.g., by the speed of sound in the medium), as determined by Snell's law. Please note that in a preferred embodiment of the invention, the segments are ½ wavelength long, and are separated from one another by a distance of ½ wavelength (e.g., see FIG. 6). The wavelength referred to is that of the sonic beam travelling down the pipe wall (e.g., the phase velocity divided by the transmit frequency). For example, the boxes of 111, 112, 121, 122 illustrated in FIG. 1 or FIG. 2 representing individual segments are actually spaced a distance apart from one another.

In the case of metal pipes, the frequency chosen will be equal to the radial direction pipe wall resonance frequency, to establish a Lamb wave travelling down the pipe wall. The crystal phase velocity Vphase of the crystal is determined by the distance between transducer segments divided by the time delay in application of the pulse train to adjacent segments. Control of this time delay is determined by examination of the amplitude and phase characteristics of the signal received by the downstream transducer (e.g., 121), which also includes an identically segmented crystal, and which can alternatively act as a Transmitter, with the upstream transducer (e.g., 111) acting as a Receiver. Accordingly, each pair alternately sends sonic beams upstream and downstream, permitting measurement of flow according to the measured time difference between upstream and downstream sonic beam transmission times.

The transducer which acts as receiver does not receive each transmitted wavefront simultaneously, as would be so in the case for a Clamp-On transducer, in which each transmitted wave arrives simultaneously on its Ultrasonic crystal face after passing through a refractive plastic wedge. In this construction, the wavefront arrives at the emitted angle, and thus sweeps across the face of the segmented receive crystal sequentially. When the transmitted sonic beam angle is equal to the angle formed by a line drawn from the center of the Transmit crystal to the center of the Receive crystal, each segment will receive the same phase of the transmitted sonic wave, thus enhancing the amplitude and shape of the Receive signal. Therefore any signal which arrives at a different angle or at a different frequency from those preferred will be reduced in amplitude and/or distorted in envelope shape from that which arrives at the preferred angle and frequency. Digital analysis of the Upstream and Downstream received signals determines if the sonic beam angle is correct, and permits adjustment of the time delay in application of the pulse train so that future transmissions are maintained at the preferred sonic beam angle, regardless of changes in the sonic propagation velocity of the medium or flow rate.

Referring back to FIG. 1, as shown in cross section (e.g., see the left side of FIG. 1), a flexible printed circuit board (FPC) 103 is affixed around the pipe 102. The FPC 103 includes control circuitry 130, which will be described in more detail with respect to FIG. 4. At the corners of the FPC 103 are four segmented crystals (e.g., 111, 112, 121, and 122) mounted on the side closest to the pipe 102. While four segmented crystals are illustrated, in alternate embodiments, there may be additional crystals or a fewer number of crystals. For example, as discussed above, in an exemplary embodiment, crystals 112 and 122 are omitted.

In an exemplary embodiment, as shown in FIG. 2, the entire FPC 103 is attached to the pipe 102 by bonding each segmented crystal to a flatted surface 201 or area (e.g., flattened area) on the pipe, using an appropriate bonding material 203 (e.g., cement, solder or viscous liquid coupling), and then if necessary, using screw-down mounts to secure the FPC 103 in a fixed position. For example, since pipes are traditionally cylindrical with curved outer surfaces, portions of the curved outer surface can be shaved to create flat or substantially flat outer surfaces so that a surface of the crystals can entirely contact the pipe wall.

The Transmit/Receive pair of transducers (e.g., 111 and 121) is located on the same side of the pipe 102 and transmits sonic energy via reflection from the other side of the pipe, on a diametric path. The distance between the transducers is governed by selection of a preferred sonic beam angle, usually chosen as 30 degrees for a medium such as Water, 20 degrees for Oil, and 10 to 15 degrees for Natural Gas.

Figure 3:
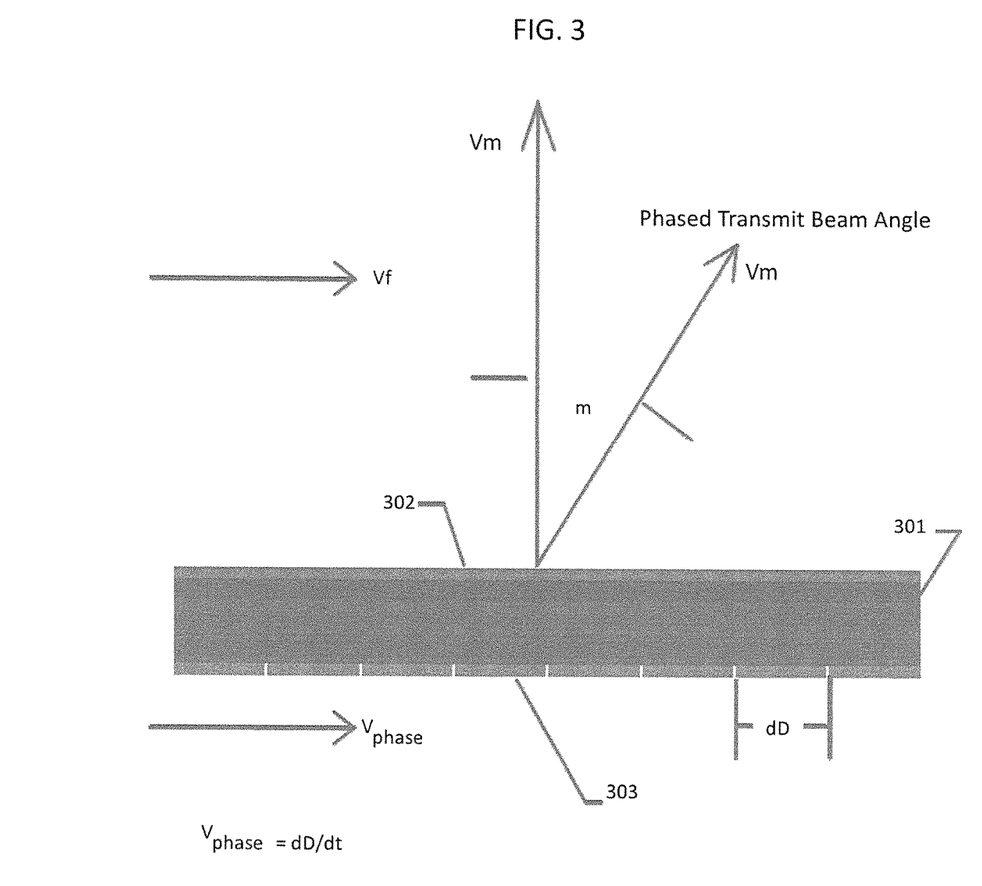
FIG. 3 illustrates an embodiment of an ultrasonic transducer of the ultrasonic flow meter.

FIG. 3 illustrates an embodiment one of the transducers (e.g., 111) of FIG. 1. Referring to FIG. 3, the structure includes a crystal 301 whose lower surface is bonded with a common electrode 302 and whose upper surface is bonded with a plurality of electrode segments 303 that allow for phase controlled beam steering to be applied. The common electrode 302 may be one continuous electrically conductive material, while the electrode segments 303 are discontinuous separate pieces of the same or a different electrically conductive material. The segments electrodes 303 may be separated from one another by a predefined distance or may be inscribed by simply cutting the surface of a larger single electrode to form separate segments insulated from each other. In an exemplary embodiment, the crystal 301 includes second electrode segments opposing the electrode segments. Thus, in this embodiment, the crystal 301 is segmented on both sides.

Referring to the velocity of the sonic beam within crystal 301 as Vphase, it should be noted that the angle of any energy derived from this beam that enters a medium (e.g., a fluid such as a gas or a liquid) in contact with the surface is governed by Snell's law depicted in Equation 1 as follows:

$$\frac{Vm}{Vphase} = \frac{\text{Sin}(m)}{\text{Sin}(p)} \qquad \text{[Equation 1]}$$

where Vm is the sonic propagation velocity of the medium, p is the angle of the beam within the emitting surface, which is parallel to the surface, and m is the angle of the beam in the medium relative to the plane of the emitting surface. If the sine of angle p is P, and P is known, then angle p is the arc sine of value P. For example, if P=1, then angle p=90 degrees. If the angle p of the beam within the emitting surface relative to the pipe surface is assumed to be 90 degrees, since the sine of 90 degrees is 1, the equation simplifies to Equation 2 as follows:

$$Vphase = \frac{Vm}{\text{Sin}(m)} \qquad \text{[Equation 2]}$$

Thus, if one wants to control the angle m of the beam in the medium to be for example 45 degrees, one needs to set the sonic phase velocity Vphase of the beam=Vm/Sin (45 degrees)=Vm/0.707=1.414×Vm. For example, if the medium is water where sound can flow at about 1493 m/s, the sonic velocity Vphase of the beam would need to be about 1.414×1493 m/s=2111 m/s to result in a 45 degree angle m. Thus, control of the phase velocity Vphase permits control of the angle m in many practical cases. Accordingly, at least one embodiment of the invention is directed to an ultrasonic flow meter, which can adjust its phase velocity Vphase dynamically.

Referring FIG. 3, if all of the electrode segments 303 were energized at the same time, it would result in the same effect as if the electrode was not segmented. However, in phase controlled beam steering, rather than energizing each segment at the same time, the segments are energized sequentially (e.g., from left to right) using a pulse train, with the time at which each segment was energized at a slight time delay relative to the prior segment. Thus, the sonic beam emitted from the surface of the crystal would no longer be normal to the surface, but rather at an angle m.

As shown by the cross section through line A-A' in FIG. 2 and with reference to FIG. 3, in an exemplary embodiment, the common electrode 301 is connected to the pipe 101 using the bonding material, and the segment electrodes 303 are connected to the FPC 103. A ground return wire may be connected from the FPC 103 to the pipe 102. For example, the upper surface of the transducer 111 shown in FIG. 2 may correspond to the segment electrodes 303, whereas the lower surface of the transducer in FIG. 2 may correspond to the common electrode 301.

Figure 4:
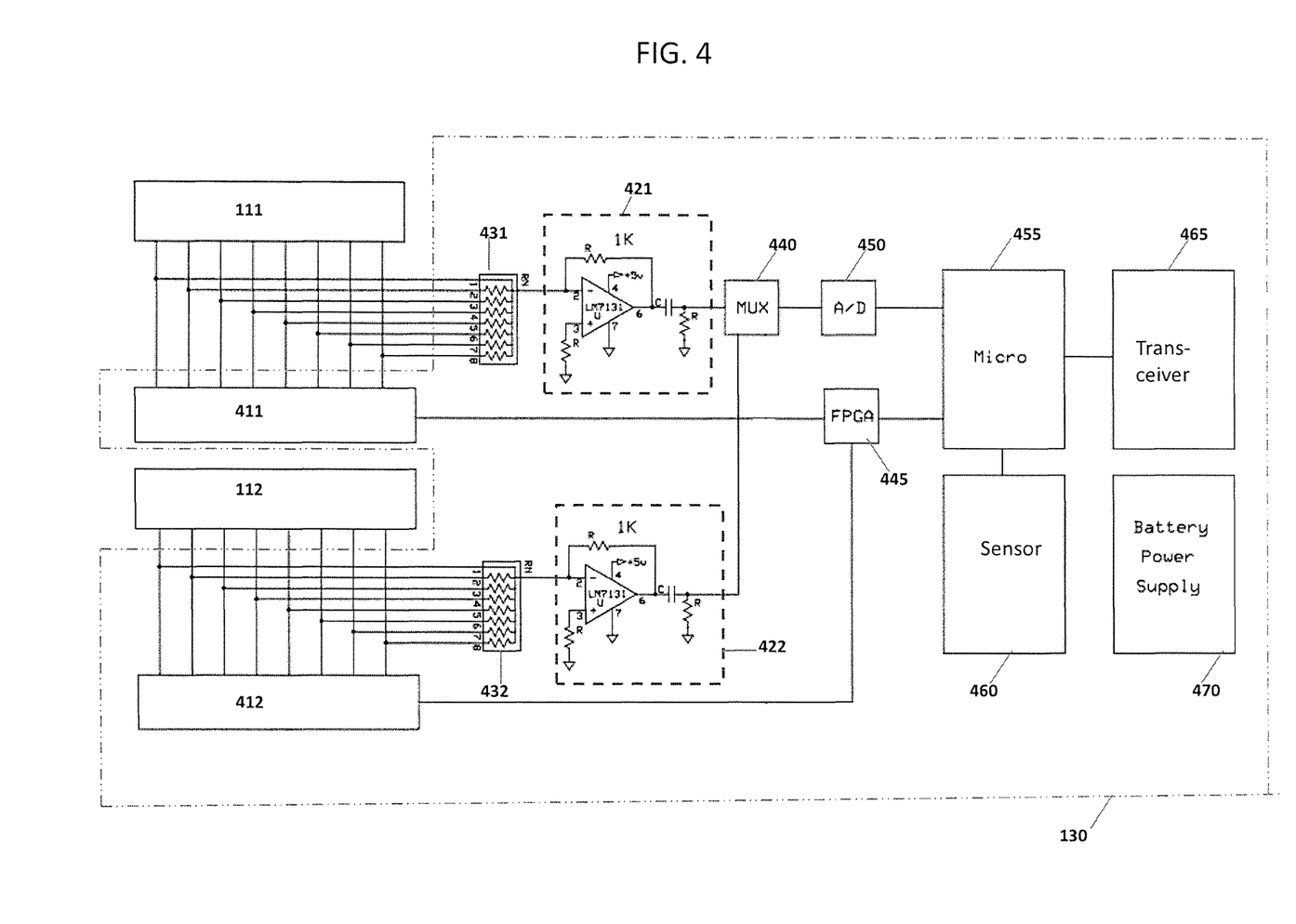
FIG. 4 illustrates a part of control circuitry of the ultrasonic flow meter according to an exemplary embodiment of the invention

FIG. 4 shows an embodiment of the control circuitry 130 of FIG. 1 used to drive the transducers and to receive ultrasonic signals from the transducers. The control circuitry 130 includes a first switching block 411, a second switching block 412, a first resistor block 431, a second resistor block 432, a first amplifier 421, a second amplifier 422, a multiplexer 440 (e.g., for transmitting a receiving data), a field programmable gate array 445, an analog to digital converter 450, a microprocessor 460, a sensor 460, a transceiver 465, and a power supply 470 (e.g., a rechargeable battery). Each switching blocks may include a discrete switch or transistor (e.g., FET) for each segment electrode within the corresponding transducer. For example, since FIG. 4 shows 8 lines, in this example, there would be 8 transistors and 8 segments. The FPGA 445 activates each segment of the transducer 111 by applying a pulse train to the lines by sequentially turning on the transistors. The pulse train is generated by a pulse generator. The microprocessor 455 together with the FPGA 445 and a given switching block 411 may correspond to the pulse generator. The pulse train will be described in more detail below with reference to FIG. 7. The FPGA 445 is controlled by the microprocessor.

When the transducer 111 acts as a downstream receiving transducer, and receives a sonic signal from an upstream or transmitting transducer (not shown), this received first sonic signal is output from the lines connected between 111 and 411 through the resistor block 431 to amplifier 421. The received first sonic signal is amplified by the amplifier 421 and then output to the multiplexer 440. Similarly, the second transducer 112 can also receive a sonic signal from an upstream transducer (not shown), and pass that second sonic signal through resistor block 432 to amplifier 422 for forwarding to the multiplexer 440. Although shown in FIG. 4, the microprocessor can sample the received sonic signals by applying a control signal to the multiplexer 440 to output the first or second sonic signal to the A/D 450. The A/D 450 performs an analog to digital conversion on the amplified received sonic signal to generate a digital signal that is output to the microprocessor 455 for use in flow rate calculations. An additional group of circuits comprising a transducer, a switching block, a resistor block, and an amplifier may be present that interfaces with the multiplexer 440 and FPGA 445 into a similar way to those structures described above that generate the first and second sonic signals. In an embodiment, 112, 412, 432, and 422 are omitted to create single beam embodiment.

The microprocessor 440 may include memory or firmware storing a computer program to perform various tasks such as control of the flow meter, processing of signals received by ultrasonic transducers (e.g., 111, 112, etc.), control of the sensor 460, and communication with the transceiver 465. The memory/firmware contains a program that controls all system functions, such as the desired Pulse Transmission Sequence, the controls for determining the required time delay for application of the Pulse Train to adjacent transducer segments (i.e., segment electrodes), and in accordance with algorithms that permit analysis of a received sonic signal that determines the need for correcting the angle of transmission, computation of all operating functions and flow, and processing of temperature and pressure data.

The transceiver 465 is capable of wirelessly transmitting data to an external source and wirelessly receiving data or commands from an external source. For example, the transceiver 465 is capable of reporting data and current operation conditions to a device (e.g., SmartPhone, Personal Computer (e.g., personal, laptop, tablet computer), or to a Master Station. The Master station may perform further processing such as Gas Chromatography, or Leak Detection. The Master station is capable of receiving the data output from as many flowmeters as desired, and to compute additional parameters or perform additional functions, as well as maintain oversight of the operation of all flowmeters as a network. The transceiver 465 may be configured to send data in various wireless communication platform formats such as BLUETOOTH, ZIGBEE, etc. The transceiver 465 may be capable of sending or receiving data over a computer network (e.g., the Internet, a private network, etc) or a cellular network.

Referring back to FIG. 4, the system can be configured as a single beam or a dual beam. For example, when transducers 111, 112, 121, and 122 are present, it is a single beam, and when only transducers 111 and 112 are present, it is a dual beam. Further, additional beams may be provided (e.g., a tri-beam), by adding additional transducers to the FPC 103. As an example, a range of pipe sizes most appropriate for the above-described bond-on flowmeter is any pipe diameter above 3 inches. However, pipe diameters down to 1 inch can be accommodated with single beam systems and remote electronics.

Figure 5:
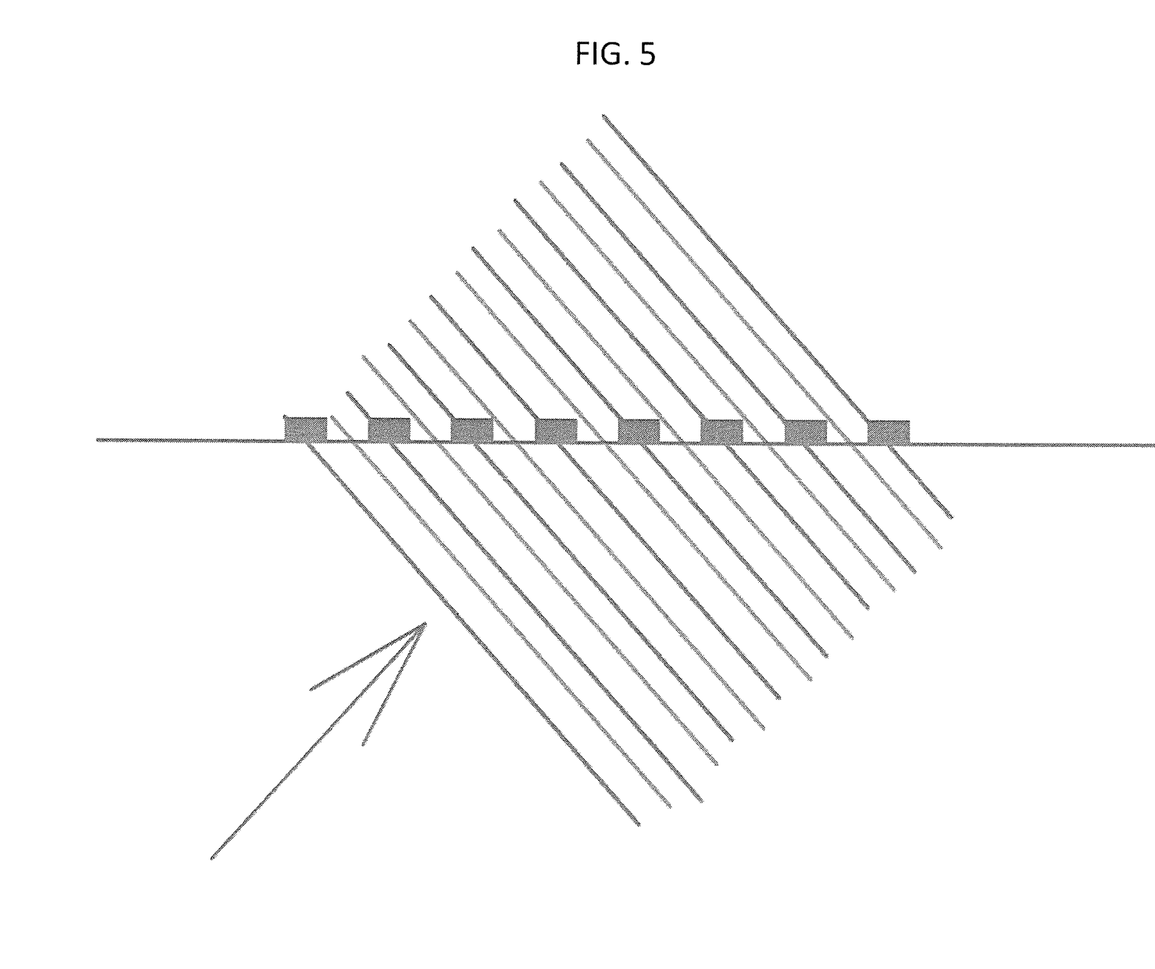
FIG. 5 illustrates the gaps between transducer segments acting as a frequency and refraction angle filter.

As shown in FIG. 1, the connections to each transducer segment are included on the FPC 103, avoiding the need for external wiring, a benefit unique to the bond-on flowmeter. While the Transmit pulses are applied to each segment electrode sequentially, the receive signals are detected simultaneously. As may be seen from FIG. 5, only received signal arriving at the preferred angle and at the preferred Transmit frequency arrive at the Receive transducer so that all segments (e.g., segment electrodes) receive synchronous phases of the sonic signal. This acts as a mechanical angle and frequency filter, maximizing only those signals that meet this criterion. Thus analyzing this signal allows detection of deviation of the sonic beam angle from the preferred value.

As shown in FIG. 1, in an embodiment, the entire circuit board (i.e., FPC 103) is enclosed within an enclosure 101. In an embodiment, the cover 101 is metal or plastic. For example, the enclosure 101 can be a ¼ inch thick metal enclosure welded to the pipe 102. This has a very low profile, permitted by the low height of the bond-on transducer. The entire structure may be potted to eliminate any unfilled spaces, and covered by a plastic or sheet metal cover. In embodiment, mounting structures electrically insulate the piezoelectric elements (e.g., the piezoelectric crystals) from the pipe. In an exemplary embodiment, mounting structures fix the orientation and spacing of the transducer pairs relative to the surface or axis and circumference of the pipe.

In combination with the use of a low voltage battery power supply 470, fed from a remote low power battery charger, this construction meets the standard for intrinsic safety approval. Accordingly, the design is acceptable for a variety of international safety standards. Further, being completely non-intrusive, safety, reliability, and low maintenance are also enhanced.

Designs prior to the bond-on embodiment described herein require that a plastic wedge be affixed to the outer pipe wall, so the transducer can be affixed to the wedge at an angle relative to the pipe wall. The bond-on embodiment eliminates the need for the plastic wedge, which also eliminates a source of temperature calibration drift, while the stabilized beam angle eliminates error due to changes in the sonic propagation velocity of the medium. In addition, elimination of the plastic wedge eliminates two sonic impedance discontinuities; that between the high crystal and the low impedance wedge, and that between the wedge and the high impedance metal pipe. Thus the signal transmission efficiency is much better than that in a Clamp-On flowmeter, making the Bond-On meter superior for applications such as Natural Gas, which is more sonically attenuative than liquids.

Figure 6:
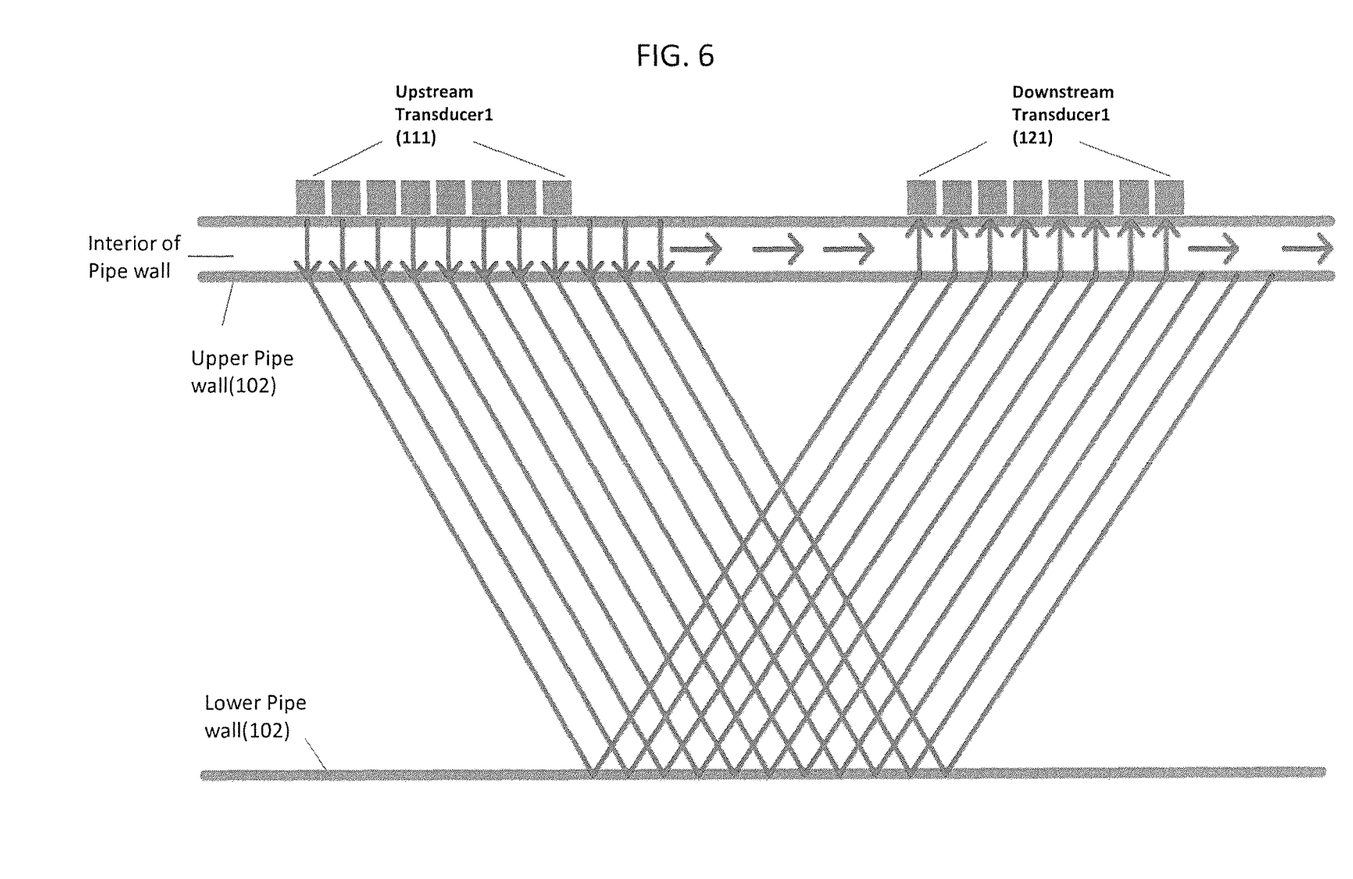
FIG. 6 illustrates the travel of the Transmit sonic beam down the pipe wall, and the resultant sonic signal traveling through the medium and arriving at the Receive transducer.

The flowmeter is based on the use of phase control as described above, to control the angle of emission of an ultrasonic beam relative to the plane of the surface of an emitter of ultrasonic energy. The plane can be the surface of a piezoelectric crystal, or the plane formed by an object onto which such ultrasonic energy has been introduced. For the purpose to be served by this invention it is intended that the sonic energy enters the emitting surface in a direction normal to a surface, such as a pipe wall, but moves in time down the axis of the pipe. This is shown in FIG. 6.

The equation for computation of flow rate is Vf=dt/2TL, where Vf is the computed flow rate, dt is the difference between the upstream and downstream time between the beginning of the transmit pulse delivered to segment 1 of the transmit transducer (e.g., 111), and the arrival of the first sonic signal at segment 1 of the receive transducer (e.g., 121), both as measured by the algorithm which controls the analysis of the received signal.

The amplitude of the sonic signal received at segment 1 at time t1 may be referred to as A1(t1), the amplitude of the sonic signal received at segment 2 at time t2 may be referred to as A2(t2), and the amplitude of the sonic signal received at an n-th signal at time t may be referred to as An(t), where n represents the segment number, which is any practical number such as 8 or 16. The summation of the amplitudes of all the received signals A1(t)+A2(2)+ . . . +An(t) may be represented by a modulated sine wave of short duration relative to the period of transmit. In processing this signal an FIR filter may be used to convert this signal to as close as possible to the shape of the transmit pulse, improving determination of the arrival of the beginning of the receive signal, which is the point in time that defines the arrival time of sonic signal. The parameter TL above is the measured transit time of the sonic beam travelling between the transmit and receive transducers.

The sonic propagation velocity Vm of the medium is the path length Lp of the sonic beam travelling between the transmit and receive transducers divided by TL, where path length Lp is defined by the following equation 3.

$$Lp = nd/\cos(\theta),  \quad \text{[Equation 3]}$$

where parameter d is the inside diameter of the pipe 102 and theta is the actual or preferred and maintained sonic beam transmission angle, and parameter n is the number of internal pipe wall reflections experiences by the sonic beam in travelling between transmit and receive transducers.

The sensor 460 may include at least one of a temperature sensor to detect the temperature and a pressure sensor to detect the pressure. The sensor 460 may transmit the detected temperature and/or pressure to the microprocessor 455. When the temperature sensor is present, it may be clamped to the exterior of the pipe 102 and located within the enclosure 101. When the pressure sensor is present, pressure may be sensed through a port drilled into the interior of the pipe that interfaces with the pressure sensor located within the enclosure 101.

The microprocessor 455 may include a setup Routine, which determines the transmit Frequency, the phase velocity and the time Interval between transmits. The microprocessor may include an operating routine, which controls the gain of amplifiers 421 and 422 and the phase velocity, and sets the location of a data collection window. The microprocessor 455 may include a flow data computation routine, which analyzes the digitized signals received from the A/D 450 to compute the phase velocity Vf and the sonic propagation velocity of the medium within the pipe 102, and automatically maintain a Zero Flow data reference and control the phase velocity. Where applicable, the microprocessor 455 processes temperature and pressure data.

The microprocessor may include a fault detection routine, which also maintains a log of various operating condition parameters, a communication I/O routine, which manages wireless data reporting and external control commands, and a battery condition monitoring routine that monitors a condition of the battery 470.

In an exemplary embodiment, a spool used to construct the pipe 120 has no internal pipe cavities or obstructions, and is only as long as the side plates of the enclosure, as determined by the spacing of the transducers (e.g., the spacing between 111 and 121). Flanges may serve as the end plates of the enclosure. For example, a flange may be attached to each end of the pipe 102. The flow-meter can then be installed by cutting out a section of a pipeline, entirely removing the section, and then affixing (e.g., welding) each flange of the flowmeter to the respective cut ends of the pipeline. As an example, the height of the FCB 103 and transducer enclosure 101 can be from ½ to ¾ inches, well below the diameter of the flanges.

Some embodiments of the flow meter are provided without flanges, especially for application to Natural Gas Distribution applications, where welding of Plastic Pipe into the network is the preferred method.

Figure 7:
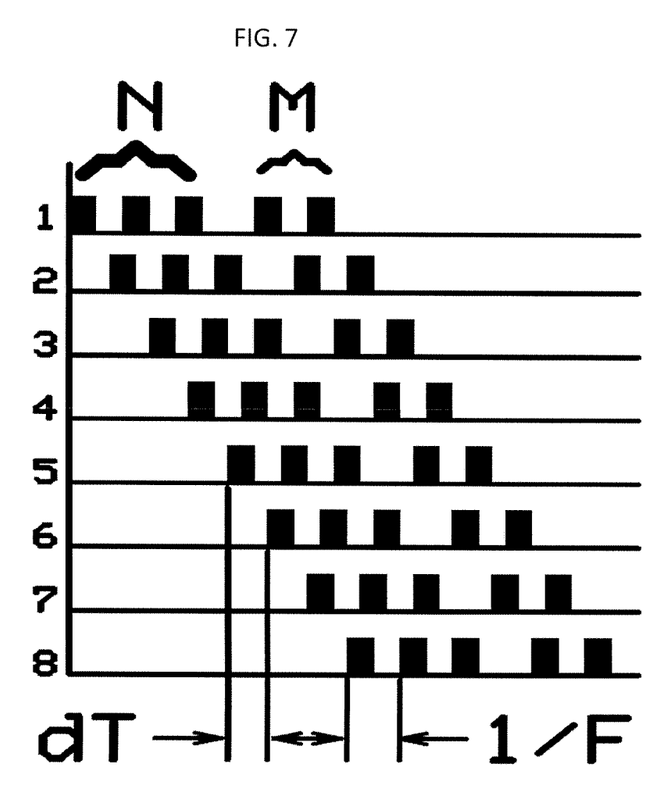
FIG. 7 illustrates the pulse train applied to the transducer segments and the time delay between application of pulses to adjacent segments.

FIG. 7 illustrates an example of a pulse train (e.g., series of sequential pulses) that can be applied to the electrode segments 303 to achieve phase controlled beam steering. For example, the first row illustrates the pulse train or pulse signal applied to the first one of the segments 303, the second row illustrates the pulse train or pulse signal applied to the second one of the segments 303, the third row illustrates the pulse train or pulse signal applied to the second one of the segments 303, etc. While FIG. 3 illustrates 8 segments or segment electrodes, the invention is not limited to any particular number of segment electrodes. For example, a pulse signal of a first duration (e.g., 1 uS) with several pulses (N) of the same duration is applied to the first segment, then the pulse signal of the same first duration is delayed by the delay time dt (e.g., number of nanoseconds), (e.g., see row 2 in FIG. 7) is applied to the second segment, then the delayed pulse signal is delayed further by the same delay time, (see e.g., row 3) is applied to the third segment, etc. For example, the delay time dt between successive pulses of the pulse signal applied to a same segment among the segments is the period of the sonic signal emitted.

Computing the angle m involves recognizing that the time delay between application of the pulse train to each segment can be interpreted as a phase velocity Vm, which is equal to the distance between segments dD divided by that time difference dt. For example Vphase=dD/dt, where dD is the distance between segments, and dt is the delay time between application of the pulse train to adjacent segments. The pulse train may be sequential and periodic application of a signal to each segment that cause corresponding portions of the crystal to be become energized and emit sonic pulses.

The generation of the sonic wave along the surface of the crystal may be identical to the case of the phase velocity Vm of the sonic wave produced by an un-segmented clamp-on transducer as it arrives on a pipe wall.

Varying the time delay dt, controls the angle m made with the emitting surface. Thus, an ultrasonic transducer with a segmented crystal driven as described above enables the sonic beam to be directed in the medium to any specific target, such as where the receive transducer is located.

Since the angle m in a clamp-on transducer case is also dependent on the sonic propagation velocity of the medium Vm, which could vary, the angle might change so as to miss the receive transducer. This can be automatically corrected as noted above by adjusting the delay time dt to optimize the beam angle to satisfy the control criteria. For example, if 3 segments were present, where segment 1 is activated at time 0, segment 2 is activated at time 1000 nsec, and segment 3 is activated at time 2000 nsec (e.g., dt=1000 nsec), and it was determined that the resulting sonic beam is missing the receive transducer, dt could be set on the fly by an apparatus generating the pulse train to a smaller or larger dt value that would result in the sonic beam hitting the receive transducer at the desired nominal angle.

Varying dt acts to "steer" the beam, and in conjunction with a feedback system, dt can be automatically controlled so as to maintain any reasonable predetermined beam angle. Since the angle of the beam changes when the medium changes, or when the velocity of the medium changes, the feedback system can be operated periodically to recalibrate dt to ensure that the beam always hits the receive transducer.

The letter N corresponds to the number of pulses in the pulse signal for activating electrode segments 303 with respective delays in a forward order during an activation period of a given transducer. After the segments 303 have been activated, they may continue to emit sonic pulses for a period of time afterward. The segments 303 can be silenced by applying a dampening signal (e.g., Damp pulse) with a number of pulses M to the segment electrodes.

Figure 8:
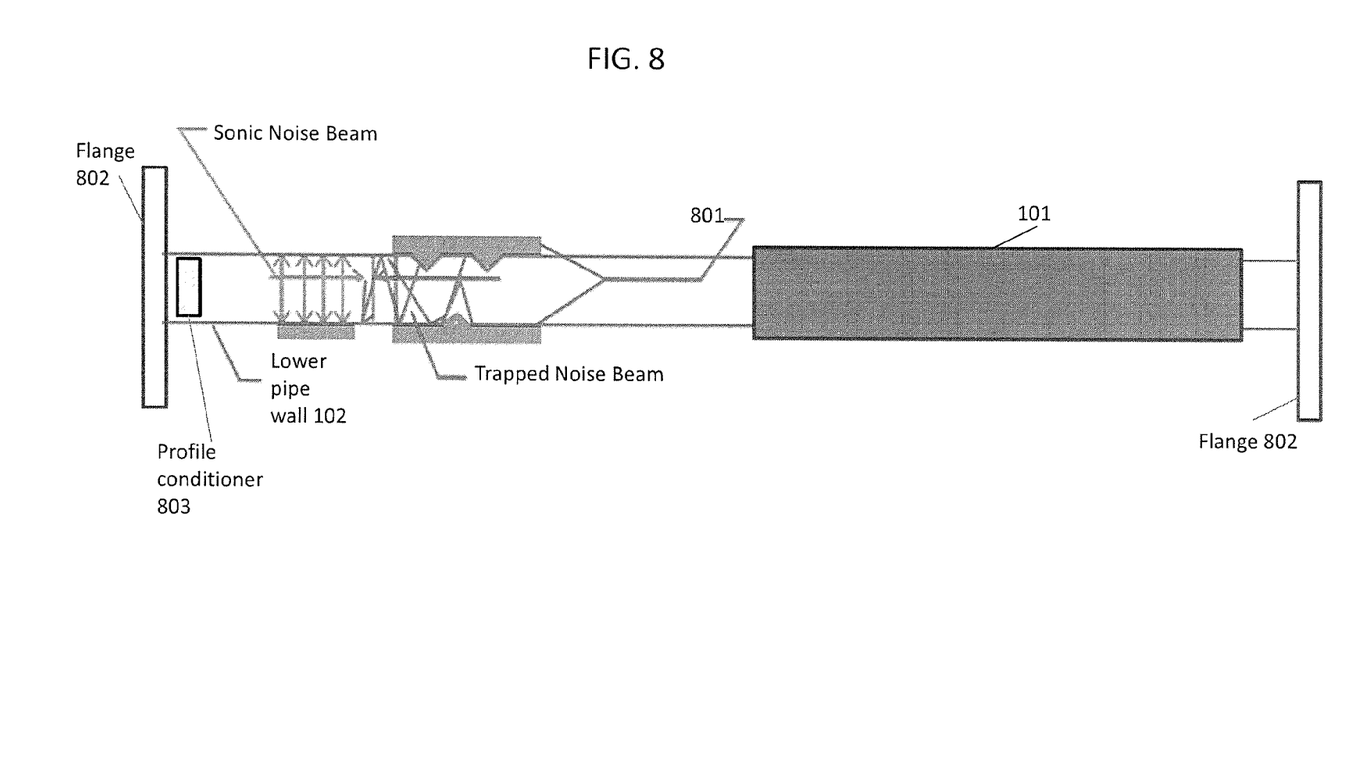
FIG. 8 illustrates the ultrasonic flowmeter being connected into an existing pipe.

As shown in FIG. 8, in an exemplary embodiment, a sonic trap consisting of a series of approximately 1 wavelength sized cuts or counter-angulated slots are formed into the interior or exterior wall of the pipe 102. Each cut may be V shaped. In an exemplary embodiment, all the V-shaped cuts are a same size. In an exemplary embodiment, the cuts are on the outside of the pipe wall 102, or the inside of the pipe wall 102, or the cuts are located on both the outside and the inside of the pipe wall 102. In an exemplary embodiment, the cuts are located on both the outside and the inside of the pipe wall, and the cuts located on the inside do not overlap with the cuts located on the outside. A sonically dissipative compound 801 such as plastic is used to fill in the wells created by the cuts. Although not illustrated in FIG. 8, the flow meter of FIG. 1 is also wrapped around the pipe 102. A wavelength refers to the distance that sound will travel in any medium over the amount of time that it takes for one cycle of the propagating frequency to be completed. For example, if the frequency of a transducer is 1 megahertz, and sound travels within the transducer at 120,000 inches per second, then sound travels 120,000/1,000,000=0.12 inches in 1 microsecond=1 wavelength. Thus, in this example, the size of the cuts would be 0.12 inches. By facing the cuts at opposite angles, the sound passing between them is reflected back and forth. Filling the slots and even the un-slotted regions on the inside and outside walls of the pipe allows the sound energy to be absorbed and dissipated before it fully escapes this trap, resulting in a profoundly improved Signal to Noise ratio at the receive transducer.

The sonic trap works by reflecting the sonic energy into a space filled with a sonically dissipative compound (e.g., plastic). The reflection of the metal is due to its much higher sonic impedance than the plastic, reflecting the energy back into to the plastic. The multiple reflections caused by the trapping serve to gradually reduce that energy that escapes from the trap, attenuating the sonic signal that could travel from the upstream (transmitter) transducer to the downstream (receiver) transducer through the pipe wall. The trap in the pipe wall 102 serves to repeatedly send the signal into the plastic coasting on the inside and optionally also on the outside wall of the pipe 102.

Also shown is a flow profile conditioner 803, which may be implemented by a stainless steel ribbon mesh, similar in construction to those ordinarily used for scrubbing pots. This construction provides ultimate mixing of the flow at the inlet of the flow meter resulting in normalizing the flow rate distribution across the entire inlet area. Since this flattening of the flow profile remains essentially the same throughout the entire short body of the flowmeter, the error producing flow profile distortion which is normally variable with flow rate and viscosity, is either eliminated or greatly reduced from normal. This flow profile conditioner 803 also produces only a minimum pressure drop as compared to drilled plate flow conditioners.

In an exemplary embodiment, the material used for the pipe 102 is identical or similar to Risan® BESHV BLK TL (aka Risan® Polyamide 11 (PA 11), since it provides both regulation acceptability as well as high Signal to Noise ratio required to meet the high accuracy claimed for Natural Gas, Oil and Water Supply applications.

In an exemplary embodiment, the microprocessor 455 or a remote station in communication with the transceiver 465 is configured to perform various algorithms including, but not limited to Transmit Operations, Sonic Signal Receive Operations, Flow Data Processing, and Communication Data Processing.

In an exemplary embodiment, the microprocessor 455 or a remote station in communication with the transceiver 465 is configured to perform various setup operations, including by not limited to input of pipe dimensions, input of a nominal transmit Tx angle, input of a nominal transit time TL, setting of a maximum time between subsequent transmissions, setting a transmit frequency, setting a number of transmit pulses, setting a number of dampening pulses, setting an initial gain of the amplifier (e.g., 421 or 422), setting time and duration of pipe signal detection window, setting initial time and duration of receive signal detection window, setting initial slew rate settings, and setting ratio of receive signal cycles to pipe signal cycles.

In an exemplary embodiment, the microprocessor 455 or a remote station in communication with the transceiver 465 is configured to perform various operating algorithms such as transmission of sonic signals, collection of digital data, and analysis of data. In an exemplary embodiment, the analysis is performed that includes: adjusting an amplifier gain register with a gain value AmpGain for the amplifier; computing a center of energy when segment delay is stable; adjusting an adjust receive signal window start time register if the AmpGain and Segment Delay are stable; adjusting receive window start time register if AmpGain and Segment Delay are stable; adjusting receive window duration register if AmpGain and Segment Delay are stable; adjusting data clock frequency if the AmpGain and Segment Delay are stable; and adjusting Beam Angle (e.g., transmit angle Tx of ultrasonic signal) if the AmpGain and Segment Delay are stable.

In an exemplary embodiment, the microprocessor 455 or a remote station in communication with the transceiver 465 is configured to declare a Fault Warning when there is no Signal or it encounters an impossible Data Condition.

In an exemplary embodiment, the microprocessor 455 or a remote station in communication with the transceiver 465 is configured compute upstream and downstream times, compute transit time TL, compute dT, compute delay time dTpipe introduced by use of circuitry to detect a received signal, measure/compute temperature/pressure, compute a Linear Flow Rate, Volumetric Flow Rate, Density, Compute Mass Flow Rate, compute Non-Homogeneity/Aeration and store the computed values in one more values.

In an exemplary embodiment, the microprocessor 455 or a remote station in communication with the transceiver 465 is configured provide various additional algorithms, as described below.

a. AmpGain

The gain of the amplifier (e.g., 421 or 422) is controlled by arrival of a Receive signal which is larger than the upper signal amplitude threshold, which causes a gain decrease by incrementation of a Gain Control Register. A Transmit cycle which does not result in a signal that breaks this threshold, results in a reverse incrementation. A SmartSlew algorithm is activated when successive cycles of Transmit cause an increase in the rate of incrementation, according to an appropriate schedule in each case where SmartSlew is applied.

In general, after Initial Makeup, AmpGain is the highest priority and should be completed, as signified by reversals of AmpGain incrementation sign, before other Control Algorithms are activated. In an embodiment, the method includes: Transmitting an ultrasonic sonic either Upstream or Downstream as required by the normal schedule; determining whether the Max Amplitude threshold is breached; decreasing the up or down gain control register if it is breached; increasing the gain control register at a number of units which increase at a rate proportional to the number of times that the sense of incrementation is unchanged; and once a Reversal is detected, the next incrementation is reversed, but at first at half the last increment before the reversal, and then continues normally.

b. Center of Energy

This algorithm is used as a quick way of locating the arrival time of the Receive signal, so that the Receive signal window can be quickly positioned. It has validity only after the AmpGain process has completed. The algorithm includes: collecting all time stamped receive signal data in the selected receive signal window; squaring each value; computing the mean arrival time of all time stamped data and store the computed value.

c. ZeroMatic

The algorithm is used to detect any drift in the non-common mode factors which affect the computation of dT, and correct for such drift. Referring to FIG. 7, the difference in the time it takes a first signal to propagate to the receive transducer (e.g., 121) via only the interior of the pipewall and the time it takes a second signal to propagate to the receive transducer by reflecting off the lower pipe wall can be used to adjust dT. For example, this delay time can be used can added or subtracted from dT.

d. Finding dT

The parameter dT is defined as the difference in the arrival time of the Up versus the Down Receive signal. After the AmpGain and Tx Angle algorithms have been applied, it is assumed that the Up and Down Receive signals, other than residual Non-Common Mode effects, are essentially identical in size and shape. Thus correlating the Receive signals in their corresponding Windows reveals the time difference between their arrival times in the highest resolution possible. The method includes: assuring that AmpGain, Tx Angle and the Up and Down Window Placements have been satisfied; multiplying the absolute amplitude values and respective clock count values for each data point in their respective Windows; calculating the mean arrival time of data in each window; storing the difference in Arrival Times in a Register; and subtracting or adding the ZeroMatic value for storage in a register representing dT.

e. Finding TLu and TLd

The average of the upstream time TLu and the downstream time TLd is a prime factor in computing actual flow rate, and must be determined accurately. Unfortunately, the first arrival of the respective Up and Down Receive signals is at Zero amplitude, and therefore cannot be measured directly, only implicitly. Therefore, TL Up and TL Down will be defined as the arrival of the first statistically significant Receive Signal Zero Crossover of opposite sign that is better than the first statistically recognizable Zero Crossover. By definition, this should be the one created exactly one Tx cycle after the beginning of Tx, which will be the reference for TLu and TLd. The method includes: measuring the statistical value of the noise at the beginning of the Receive Windows as the ratio of the average maximum Running Value divided by the average Running Value; finding the first near zero signal value which has a statistically higher significance; choosing the Next Highest Crossover by defining its Arrival Time by computation from adjacent data points using short term averaging, and storage of the result as TLu or TLd.

f. Tx Angle Control

The Tx Angle Control is important to the function of the Bond-On flowmeter, to correct for changes in medium refraction angle, and in some cases for Beam Blowing. There are a number of indications in the data that determine the magnitude and direction in which the angle of the sonic beam is deviant.

A difference in the correlation of the Receive Signal relative to the Pipe Signal, from which the Receive signal is derived from Beam Splitting can be computed by: memorizing the Data within the Up and Down Pipe Signal Window; determining the Best Correlation Value of the Data in the Up or Down Receive Signal Windows to the Pipe Signal Data; determining if and which way the Tx angle needs to be moved to improve the correlation; and performing a SmartSlew as required.

A difference of the measured TLu or TLd, from that predicted from the last reported value of VL (e.g., the Medium's Sonic Propagation Velocity) and the Nominal Value of the Beam Angle, may be computed by: computing predicted TLu or TLd from last values of Tx command and VL; comparing predicted value to last measured value; and it the result of the comparing is too long, incrementing Tx Angle in correct direction using SmartSlew.

A difference in the computed average Receive Signal Frequency from that of Tx is computed by: computing average frequency of Receive Signal from Data; incrementing Tx Angle to Increase Angle if the frequency is too high; and decrementing TX Angle to Decrease Angle if the frequency is too low, using SmartSlew.

A deviation in the Best Correlation between Up and Down Receive Signals from the value recorded during manufacturing tests may be performed by: memorizing either Up or Down Receive Signal Data; memorizing either Down or Up Receive Signal Data; using COEu and COEd to locate Data relative to each other to find value of Best Correlation; and from Value and Trend of Correlation Data, using a Method to increase or decrease the Tx Angle.

Figure 9:
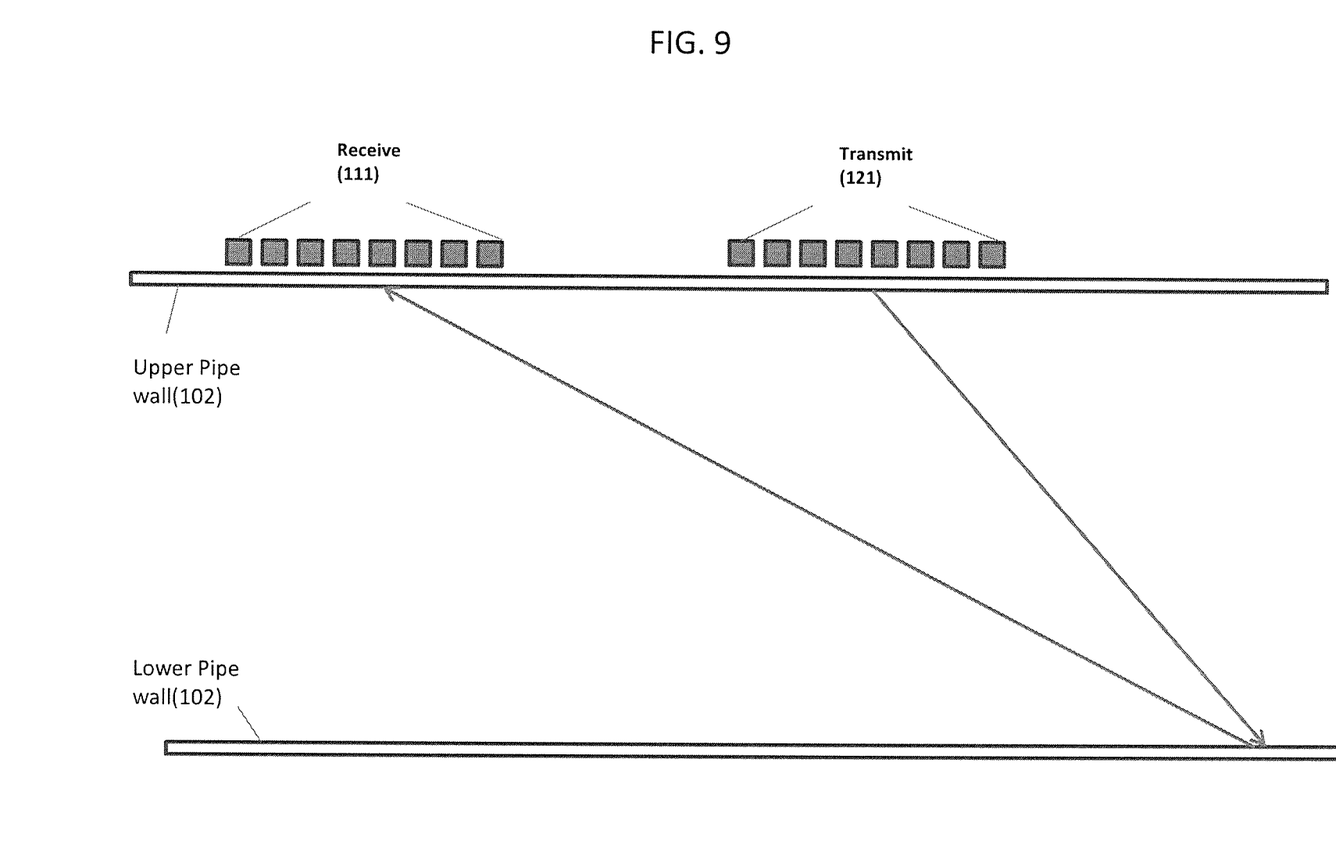
FIG. 9 illustrates an example of the ultrasonic flowmeter being operated as a Doppler flowmeter.

When a pair of Bond-On transducers are aligned side by side as shown in FIG. 9, both facing in the same direction, and of one of them is driven by a continuous wave at the radial frequency of the pipe wall, the second transducer will act as a receiver of any energy reflected from the medium. In that sense, this arrangement is similar to that of a clamp-On Doppler flowmeter, except for the use of the Bond-On design. The frequency of the reflected sonic signals is shifted either up or down proportional to the flow velocity. The flow rate can then be determined from the shifted frequency is. However, the Bond-On Transducer is sensitive to the angle at which the reflected sonic signal makes with the pipe wall, preferably at the same angle as that transmitted, at preferably at the nominal frequency which would have prevailed had flow been Zero, in an exemplary embodiment, one of the transducers is driven by the continuous wave by activated its segment electrodes in an order and for respective durations that cause emission of a sonic signal shaped as a carrier wave.

Accordingly, a superior Doppler response will be created by controlling the Transmit frequency so that the Reflected frequency is the same as it would have been at Zero flow rate. This can be determined by correlating the amplified Reflected signal against the known period of the un-shifted Transmit frequency, and altering the actual Transmit frequency until the "beat" between the actual Reflected signal and the memorized un-shifted original Transmit signal demodulates to Zero. A correlation function can also determine the correct frequency shift required in the actual Transmit signal, under flow, to achieve this same result. Accordingly, the shifted Transmit frequency, readily measured, represents the Doppler shift, permitting accurate calculation of the actual flow rate.

In addition, control of the angle of the sonic beam permits optimization of the Transmit angle, so as to maximize the amplitude of the Reflection received on the Receive transducer, which might have been shifted from an optimum angle by a change in the sonic propagation velocity of the liquid medium from a previous condition. This is accomplished by changing the phase delay between the signals applied to adjacent Transducer Segments in the same way as previously described for the Transit-time flowmeter.

According to an exemplary embodiment of the invention, a pair of Segmented Crystal Ultrasonic Transducers is operated in Phase Array mode, and installed on a pipe. One of the transducers is operated to act as a transmitter (e.g., see 121 in FIG. 9) of a controlled frequency continuous wave, and the other (e.g., see 111 in FIG. 9) is operated to act as a Receiver of reflected sonic energy, in such a way that the Transmit frequency is controlled so that the Received frequency, affected by the Doppler shift due to flow rate, is shifted by such an amount so as to cause the Reflected frequency to be returned to that which is applied when the flow rate was zero. A means is provided for controlling the phase delay between application of a controlled frequency continuous wave to the Transmitter transducer Segments, so as to maximize the amplitude of the reflected signal at the Receive Transducer. The computed optimum angle reveals the sonic propagation velocity of the medium.

Although the illustrative embodiments have been described herein with reference to the accompanying drawings, it is to be understood that the present invention is not limited to those precise embodiments, and that various other changes and modifications may be affected therein by one of ordinary skill in the related art without departing from the scope or spirit of the invention. All such changes and modifications are intended to be included within the scope of the disclosure.

What is claimed is:

1. An ultrasonic flowmeter comprising:
   a conduit for receiving a flow of a fluid;
   a flexible printed circuit board (FPC) comprising:
      a first ultrasonic transducer comprising a plurality of first segment electrodes located on a first side of a single first piezoelectric element;
      a second ultrasonic transducer comprising a plurality of second segment electrodes located on a first side of a single second piezoelectric element;
      a control circuit configured to sequentially activate the first segment electrodes using a pulse train to transmit a plurality of sonic signals to the second ultrasonic transducer,
      wherein a delay time between activation of each successive first segment electrode controls a phase velocity and an angle of emission of the corresponding sonic signal,
      wherein the FPC is bonded around the conduit.

2. The ultrasonic flowmeter of claim 1, wherein the first ultrasonic transducer includes a first common electrode disposed on a second opposing side of the first piezoelectric element that is bonded to the conduit and the second ultrasonic transducer includes a second common electrode disposed on a second opposing side of the second piezoelectric element that is bonded to the conduit.

3. The ultrasonic flowmeter of claim 2, wherein the conduit is substantially cylindrical in shape except for a plurality of flatted areas to which the common electrodes are bonded using a bonding material, wherein each of the piezoelectric elements is a piezoelectric crystal or ceramic.

4. The ultrasonic flow meter of claim 2, wherein the first segment electrodes, the first piezoelectric element, and the first common electrode are sequentially stacked in a direction normal to an outer surface of the conduit, wherein the second segment electrodes, the second piezoelectric elements, and the second common electrode are sequentially stacked in a direction normal to the outer surface.

5. The ultrasonic flowmeter of claim 1, wherein the control circuit comprises a pulse generator that applies the pulse train to each individual first segment electrode at a time delayed from that applied to its prior first segment electrode.

6. The ultrasonic flowmeter of claim 1, further comprising a mounting structure that insulates each piezoelectric element from the conduit.

7. The ultrasonic flowmeter of claim 1, wherein the control circuit is configured to analyze one of the sonic signals received by the second ultrasonic transducer to determine whether the angle of emission has deviated from a preferred emission angle, and adjusts the time delay to a different value when it determines the deviation is present.

8. The ultrasonic flowmeter of claim 7, wherein the control circuit determines whether the deviation is present by analyzing an amplitude or a phase of the received one of the sonic signals.

9. The ultrasonic flowmeter of claim 8, wherein the control circuit performs the analyzing by determining how similar a shape of the received one of the sonic signals is to a reference signal.

10. The ultrasonic flowmeter of claim 8, wherein the control circuit performs the analyzing by determining an arrival time of an earliest peak and median sonic energy of the received one of the sonic signals.

11. The ultrasonic flowmeter of claim 1, further comprising a structure configured to mount the conduit to a pair of pipe flanges.

12. The ultrasonic flowmeter of claim 1, wherein the conduit includes a stainless steel mesh configured as a flow profile conditioner.

13. The ultrasonic flowmeter of claim 1, wherein an inner surface of the conduit includes a plurality of counter-angulated cuts, and a sonically dissipative material fills the cuts.

14. The ultrasonic flowmeter of claim 1, wherein the control circuit comprises a multiplexing device to permit delivery of the pulse train to the first segment electrodes and collection of the received sonic signals.

15. The ultrasonic flowmeter of claim 1, wherein the control circuit is configured to calculate a flow rate of the fluid from the received sonic signals.

16. The ultrasonic flowmeter of claim 15, further comprising a wireless transceiver configured to wirelessly transmit the flow rate to a remote device.

17. The ultrasonic flowmeter of claim 1, wherein the conduit comprises Polyamide.

18. The ultrasonic flowmeter of claim 1, wherein the flexible printed circuit board (FPC) further comprises a third ultrasonic transducer and a fourth ultrasonic transducer, wherein the third ultrasonic transducer comprises a third piezoelectric element and a plurality of third segment electrodes, the fourth ultrasonic transducer comprises a fourth piezoelectric element and a plurality of fourth segment electrodes, wherein the first and second ultrasonic transducers are arranged along a first axis, and the third and fourth ultrasonic transducers are arranged along a second axis disposed about 180 degrees away from the first axis on an outer surface of the conduit.

19. The ultrasonic flowmeter of claim 1, further comprising a case entirely surrounding the FPC, wherein edges of the case are affixed to the conduit.

20. An ultrasonic flowmeter comprising:
a conduit for receiving a flow of a fluid;
a flexible printed circuit board (FPC) comprising:
  a first ultrasonic transducer comprising a plurality of first segment electrodes located on a first side of a single first piezoelectric element;
  a second ultrasonic transducer comprising a plurality of second segment electrodes located on a first side of a single second piezoelectric element;
  a control circuit configured to sequentially activate the first segment electrodes using a pulse train to transmit a controlled frequency wave so that the second ultrasonic transducer receives a reflected wave, and
wherein the control circuit is operated so that a transmit frequency of the transmitted wave is controlled so that a frequency of the received reflected wave, affected by a Doppler shift due to flow rate, is shifted by such an amount so as to cause a frequency of the reflected wave to be returned to that which is applied when the flow rate was zero,
wherein the FPC is bonded around the conduit.

* * * * *